UNITED STATES PATENT OFFICE.

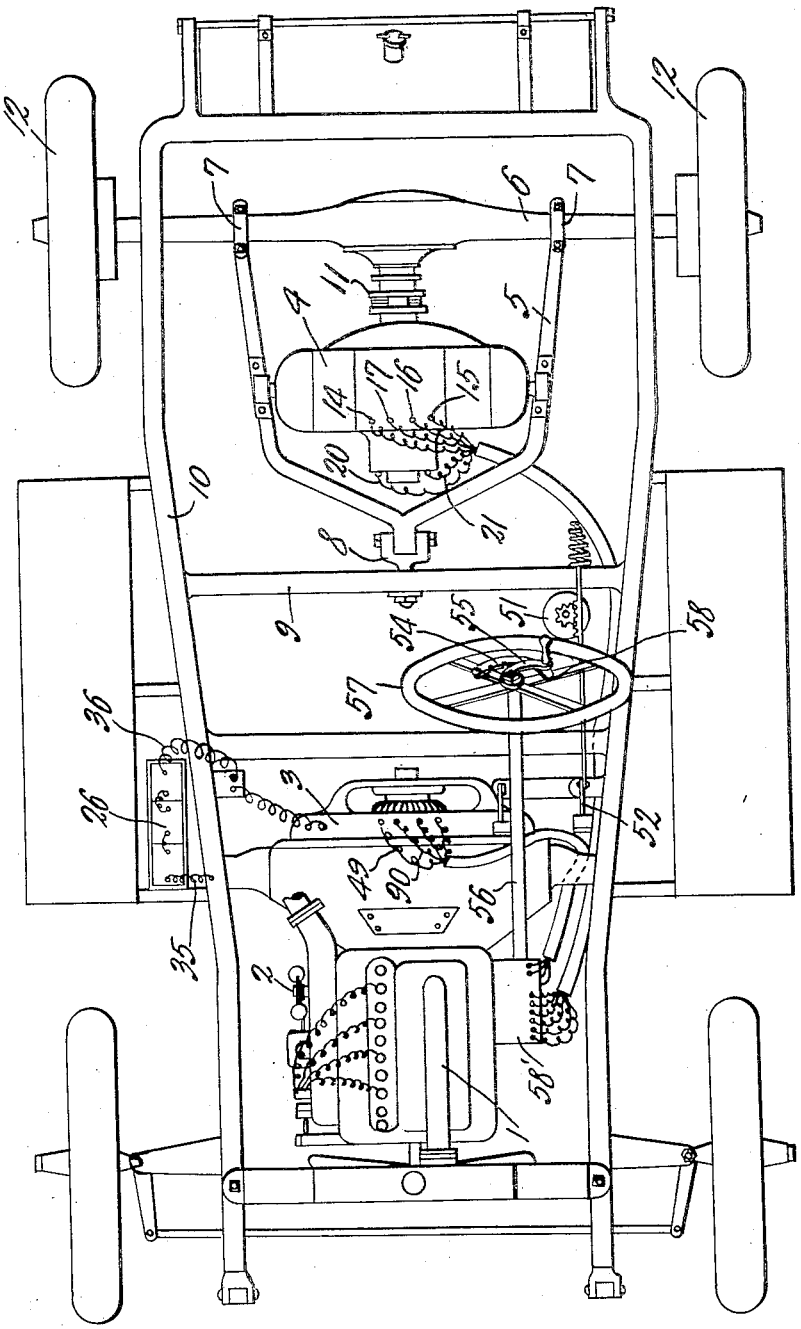

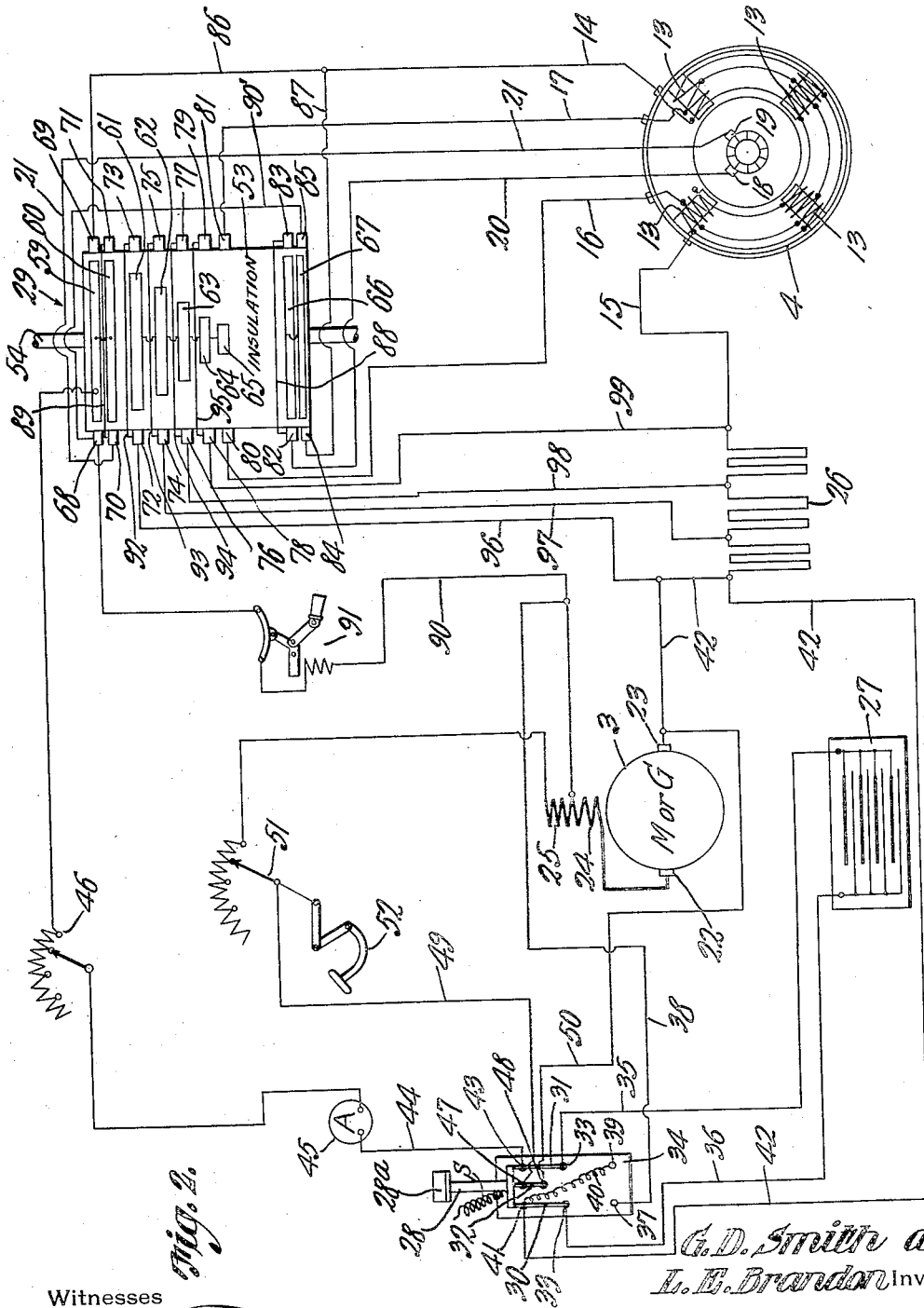

GUY D. SMITH AND LAWRENCE E. BRANDON, OF WEST DERBY, VERMONT, ASSIGNORS TO THEMSELVES AND DELOS R. MARVIN AND WALLACE D. MARVIN, OF WEST DERBY, VERMONT, AND CHARLES J. OBEN, GEORGE R. LAWRENCE, AND WILLIAM C. LINDSAY, OF NEWPORT, VERMONT.

POWER PLANT AND CONTROL.

1,236,221.      Specification of Letters Patent.      Patented Aug. 7, 1917.

Application filed January 28, 1916. Serial No. 74,903.

*To all whom it may concern:*

Be it known that we, GUY D. SMITH and LAWRENCE E. BRANDON, citizens of the United States, residing at West Derby, in the county of Orleans, State of Vermont, have invented a new and useful Power Plant and Control, of which the following is a specification.

The present invention relates to a power plant and control therefor adapted especially for use upon automobiles or other motive vehicles for driving and propulsion purposes, although it can be adopted in ships and elsewhere for purpose of propulsion or the like, and it is the object of the invention to provide an electrical or magnetic system of transmission between the engine or other prime mover and the driven element (the driving wheels, propeller, or the like either singly or in multiple), whereby there is an ease and flexibility of action, a nicety of mechanical operation and control, and other advantageous characteristics, as now found in electrically propelled vehicles.

The present structure includes improvements in the combination of a dynamo operated by the engine and in turn operating a motor which is connected to the driven element, the usual clutch, transmission mechanism and all correlative gearing and devices which are usually employed between the engine and driven element being eliminated, thus dispensing with the attendant wear, tear and breakage incident to the use of said devices, it only being necessary to connect the dynamo and motor by flexible conductors, and the speed and direction of propulsion being controlled conveniently and effectively simply by manipulating a small handle or lever. The present apparatus eliminates jars and shocks during the operation of the machine, and when the speed is accelerated or decreased, and the invention provides for many other advantages, some of which will be pointed out hereinafter, and others which will be apparent to those skilled in the art.

The invention also includes novel means for controlling the speed of rotation of the motor, the electrical energy created by the dynamo, and the connections of the storage battery with the dynamo, said dynamo being used either as a generator for operating the motor, or as a series motor for starting the engine, and the storage battery being used for the latter purpose only, so that a minimum number of cells only need be employed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of an automobile chassis illustrating the present improvements applied thereto.

Fig. 2 is a diagrammatical view of the electrical system.

The apparatus includes an internal combustion engine or other suitable prime mover 1, which is preferably run at a constant speed through the medium of a suitable governor 2, whereby the engine will run smoothly, with less wear and tear than when responding as a power unit independently by itself to supply both operating and propulsion load, or when the motor is throttled, and enabling a fixed adjustment of the carbureter or vaporizer to be made. The constant speed of the engine also enables kerosene and cheaper fuels to be used, since there will be no variations in the speed of the engine, even when traveling on hills, and therefore requiring no adjustments of the carbureter as is ordinarily the case with an automobile propelled strictly by a hydrocarbon engine.

The engine 1 operates a dynamo 3 assembled therewith, and said dynamo has compound wound field coils, and is adapted to be used either as a generator for operating the motor 4, or as a series motor for starting the engine 1, as will hereinafter more fully appear. The dynamo 3 is assembled with the engine 1, while the motor 4, which is disconnected physically from the engine and dynamo, is assembled with the driven element which in the present case, is the propelling means.

The motor 4 is mounted within and has its sides trunnioned to the limbs of a U-shaped radius member 5 having its terminals provided with clamps 7 embracing the rear axle 6, and having its intermediate portion connected by a universal joint 8 with a cross bar 9 of the frame 10, whereby the rear axle is of the floating type, the universal joint 8 being such that wear can be taken up. The member 5 can swing in various directions, and the motor 4 and axle 6 being connected to said member 5 will be held in coöperative relation at all times, there being a suitable flexible connection 11 between the motor 4 and the differential gearing (not shown) which is connected to the driving wheels 12.

The electric motor 4 is of the series wound type, and includes the field coils 13 having certain terminals connected to a conductor or leader 14, and said field coils have their other ends connected to another conductor or leader 15. Conductors or leaders 16 and 17 are connected to the field coils between the ends thereof, it being noted that the motor has special connections, although this is not compulsory, since the special features can be eliminated as will be apparent when the invention is more fully understood. Connected to the commutator brushes 18 and 19 are the respective conductors or leaders 20 and 21.

The dynamo 3 is of the compound wound type, as above indicated, and has the commutator brushes 22—23, the series field coil 24 and shunt field coil 25 being connected to the brush 22.

The electrical system also includes a suitable resistance 26, the storage or secondary battery 27, a switch 28 and a controller 29, which instrumentalities are electrically connected with one another and with the dynamo and motor, as will hereinafter more fully appear.

The switch 28, which is preferably provided with or connected to a foot pedal 28ª, or other device, in order that it can be readily operated by the foot of the operator, or other means, has a pair of blades 30—31, and another blade 32, the blades 30—31 being pivoted, as at 33, to a suitable base 34, and the blades 30—31 are continuously connected by the respective conductors or leaders 36—35 with the opposite poles or terminals of the storage battery 27. The base 34 is provided at one end with a contact 37 for the engagement of the blade 30, and said contact 37 is connected by a conductor or leader 38 with the coil 24 of the dynamo 3. The base 34 has a contact 39 acting as a companion to the contact 37, for the engagement of the blade 31, and said contact 39 is connected by a conductor 40 with a diagonally opposite contact 41 carried by the other end of the base 34 for the engagement of the blade 30. The contact 41 is connected by a conductor 42 with the commutator brush 23 of the dynamo, and the base 34 has a contact 43 adjacent the contact 41 for the engagement of the blade 31. This contact 43 has a conductor 44 connected therewith, and in which is interposed an ammeter 45, and a rheostat 46. The base 34 is provided between the contacts 41 and 43 with a pair of contacts 47—48 for the engagement of the blade 32 when the blades 30—31 are engaged with the contacts 41—43. The contact 48 is connected by a conductor or leader 50 with the brush 23, and the contact 47 is connected by a conductor 49 with the shunt field coil 25. A rheostat 51 is interposed in the conductor 49, and is preferably connected to a pedal 52 adapted to be operated by the foot of the operator.

Coming to the controller 29 and its connections, said controller embodies a drum or cylinder 53 mounted upon a shaft 54 having at one end a handle, lever or operating member 55 adapted to be swung or moved by the hand of the operator. It is preferable to have the controller shaft 54 extended through the steering post or shaft 56, and to have the handle 55 associated with the hand wheel 57, and suitable means may be provided for holding and indicating the position of the handle 55, such as a segment 58. The drum 53 is inclosed within a case 58' preferably arranged at the lower or forward end of the steering post 56. Secured upon the periphery of the drum 53 are the arcuate contact strips 59, 60, 61, 62, 63, 64, 65, 66 and 67 which are spaced apart longitudinally and which extend partially around the circumference of the drum. The strips 59, 60, 66 and 67 are the longest, and are of approximately equal length, the strips 59 and 60 being electrically connected with one another, which is also true of the strips 66 and 67. The strip 61 is shorter in length than the strips 59, 60, 66 and 67, so that its ends terminate short of the ends of said strips, and the strips 61, 62, 63, 64 and 65 decrease in length in succession, so that the ends thereof are in stepped arrangement. Disposed at one side of the drum 53 is a longitudinal series of contacts 68, 70, 72, 74, 76, 78, 80, 82 and 84 and arranged at the opposite side of the drum is a longitudinal series of contacts 69, 71, 73, 75, 77, 79, 81, 83 and 85. The contacts 68 and 69 are adapted to be engaged by the strip 59, the contacts 70 and 71 by the strip 60, the contacts 72 and 73 by the strip 61, the contacts 74 and 75 by the strip 62, the contacts 76 and 77 by the strip 63, the contacts 78 and 79 by the strip 64, the contacts 80 and 81 by the strip 65, the contacts 82 and 83 by the strip 66, and the contacts 84 and 85 by the strip 67. Normally, the strips are in neutral or intermediate position between the opposite contacts, so that the circuits are all open, and when the drum is rotated in one direction, the contact strips are engageable with one set of contacts, and when the drum is reversed, the contact strips engage with the opposite set of contacts, thus providing for reversing of the motor 4, and the control of the speed of rotation of the motor in either direction. The contact strips 61, 62, 63, 64 and 65 are not engageable with their contacts until after the contact strips 59, 60, 66 and 67 have engaged their contacts, and the strips 61, 62, 63, 64 and 65 engage their contacts in succession, which is used for controlling the speed of the motor, it also being noted that the said contact strips 61 to 65, inclusive, leave their contacts one at a time as the drum is rotated back to neutral position. The conductor 44 is connected to strip 59.

The electrical connections of the controller 29 with the other devices are as follows: The conductor 14 leading from the motor 4 has a branch 86 connected to the contact 69, and has a branch 87 connected to the contact 84. The contact 82 is connected with the opposite contact 83 by a conductor 88. The conductor 17 is connected to the contact 81, the conductor 16 to the contact 80, the conductor 15 to one terminal of the resistance 26, the conductor 20 to the contact 82, and the conductor 21 to the contact 70. The opposite contacts 70 and 71 are connected by a conductor 89, and the contact 68 is connected by a conductor 90 with the series field coil 24 of the dynamo 3, and said conductor 90 has interposed therein a circuit breaker 91. The contact 68 is connected by a conductor 90' with the contact 85. The opposite contacts 72—73, 74—75, 76—77 and 78—79 are connected by the respective conductors 92, 93, 94 and 95. The drum 53 is of insulating material, or the contact strips are insulated therefrom in any suitable manner, the contact strips 67 and 66 being electrically connected, as well as the contact strips 59—60, and the contact strips 61, 62, 63, 64 and 65 are also electrically connected with one another, but the three sets of contact strips are insulated from one another.

The contact 72 is connected by a conductor 96 with the brush 23, the contact 74 is connected by a conductor 97 with the resistance 26 at one point thereof between its ends and adjacent that end connected to the brush 23, the contact 76 is connected by a conductor 98 to another point of the resistance 26 between the ends thereof and further remote from the brush 23, and the contact 78 is connected by a conductor 99 with the terminal of the resistance 26 remote from the brush 23.

The operation of the apparatus is as follows:

Supposing the engine to be at a standstill, it can be readily and quickly started without the necessity of manually cranking the same. Thus, the pedal 28ª is depressed and operates the switch 28, so that its blades 30 and 31 are moved into engagement with the contacts 37 and 39. This will connect the storage battery with the dynamo 3 so that the dynamo acts as a series motor for starting the engine. The circuit thus closed includes the storage battery 27, the conductor 35, the switch blade 31, contact 39, conductor 40, conductor 42, brush 23, the armature of dynamo 3, brush 22, series field coil 24, conductor 38, contact 37, switch blade 30 and conductor 36. The dynamo 3 is thus energized to operate as a series motor for starting the engine. Then, when the engine is started, the switch 28 is operated to move its blades 30 and 31 into engagement with the contacts 41 and 43, whereby the storage battery is disconnected from the dynamo. The dynamo will now be operated by the engine, and will act as a generator for producing the electrical energy to operate the motor 4.

When the automobile is at a standstill or is drifting, the controller 29 is in neutral or intermediate position. To start the automobile forward, the drum 53 is operated in one direction so that the contact strips 59, 60, 66 and 67 engage the respective contacts 68, 70, 82 and 84, thus operating the motor at low speed. The circuit thus closed is as follows: The armature of the dynamo 3, brush 22, series field coil 24, the conductor 90 and its circuit breaker 91, the contact 68, strip 59, strip 60, contact 70, conductor 21, brush 19, motor armature, brush 18, conductor 20, contact 82, strip 66, strip 67, contact 84, conductor branch 87, conductor 14, motor field coils 13, conductor 15, resistance 26, part of conductor 42, and brush 23. It will thus be seen that the resistance 26 is interposed in the circuit, reducing the current which is effective upon the motor, and operating the motor at a low speed. The resistance 26 can be cut out step-by-step to increase the speed of the motor, and it will be evident that the speed of the motor is increased and decreased gradually, so that there are no shocks or jars.

To advance the speed of the motor, the drum 53 is rotated another step forward so that the contact strips 61 and 62 engage the contacts 72 and 74. This will shunt out a part of the resistance 26, since current can flow from the resistance along the conductor 97, contact 74, strip 62, strip 61, contact 72 and conductor 96, whereby a portion of the resistance 26 is shunted, thus increasing the electrical current which is effective upon the motor, and consequently speeding up the motor. By advancing the drum 53 another step forward, so that the contact strip 63 engages the contact 76, another portion of the resistance 26 is also shunted, since current can flow from the resistance 26 along the conductor 98, contact 76, strip 63, strip 62, strip 61, contact 72, and conductor 96 so as to shunt more of the resistance 26, and thus further increase the speed of the motor. The entire resistance 26 is cut off when the drum 53 is rotated another step to bring the contact strip 64 into engagement with the contact 78, the shunt being formed by the conductor 99, contact 78, contact strips 64, 63, 62 and 61, contact 72 and conductor 96.

Still another speed forward, for speed purposes only, as contradistinguished from drive load purposes and its attendant speed, is provided, when the drum is rotated to bring the last strip 65 into engagement with its contact 80, whereby the current will traverse only a portion of the motor field coils 13 between the conductors 14 and 15, whereas before, the current traversed all of the convolutions of the field coils 13 of the motor. Now, when the strip 65 engages the contact 80, the circuit from the motor field coils 13 is completed (shunting out a portion of each field coil) to the dynamo 3 by way of the conductor 16, contact 80, strips 65, 64, 63, 62 and 61, contact 72, conductor 96, a portion of conductor 42, and brush 23. Thus, about one-half of each of the motor field coils is shunted out, to decrease the current traversing the field coils and to increase the current traversing the armature of the motor, without appreciable reduction of the intensity of the fields of the motor 4, so as to increase the speed of the motor to the fullest extent. Now, when all line resistance 26 and half of the motor field resistance is shunted out as indicated, the circuit is completed as follows: brush 22, series field coil 24, conductor 90 and its circuit breaker 91, contact 68, strips 59 and 60, contact 70, conductor 21, motor brush 19, motor armature, motor brush 18, conductor 20, contact 82, strips 66 and 67, contact 84, conductor branch 87, conductor 14, one half of each of the field coils 13 of the motor 4, conductor 16, contact 80, strips 65, 64, 63, 62 and 61, contact 72, conductor 96, part of conductor 42, and brush 23 of the dynamo.

The resultant effect of this shunting out of all line resistance 26 in conjunction with one half of each of the motor field coils 13 is primarily to increase the speed of the motor 4 when not laboring under excessive load drive, as for instance, when an automobile is operated over level ground to procure maximum vehicle speed as in a speed spurt or competitive speed test.

When the drum 53 is rotated back to neutral position, it is evident that the speed of the motor is gradually decreased, step by step, until the controller is in neutral position, when the circuit is broken at a number of points by the controller 29, including circuit 44 between battery 27 and switch 28. The contact strips 59, 60, 66 and 67 provide with their contacts means for reversing the flow of current through the motor armature, to reverse the operation of the motor, whereby the machine can be backed. To accomplish this, the drum 53 is rotated in the reverse direction so that the contact strips 59, 60, 66 and 67 engage the respective contacts 69, 71, 83 and 85. The current in this case will flow through the field coils in the same direction as before, but will flow through the armature of the motor in the opposite direction, resulting in the reverse rotation of the armature. The circuit thus completed is as follows: the dynamo armature, brush 22, series field coil 24, conductor 90 and its circuit breaker 91, contact 68, conductor 90′, contact 85, strips 67, strip 66, contact 83, conductor 88, contact 82, conductor 20, brush 18, motor armature, brush 19, conductor 21, contact 70, conductor 89, contact 71, strip 60, strip 59, contact 69, branch 86, conductor 14, motor field coils 13, conductor 15, resistance 26, a portion of conductor 42, and brush 23. The motor will now operate backward at a low speed, but when necessary, the reverse rotation of the motor can be accelerated, by operating the drum 53 to bring the strips 61, 62, 63, 64 and 65 into successive engagement with the respective contacts 73, 75, 77, 79 and 81. The contacts 73, 75, 77 and 79 are connected to the opposite contacts 72, 74, 76 and 78, respectively, whereby the resistance 26 will be shunted out, the same as before. Finally, when the strip 64 is engaged with the contact 81, portions of the field coils 13 of the motor are shunted out, since current can flow from the field coils 13 by way of the conductor 17, contact 81, strips 65, 64, 63, 62 and 61, contact 72, and conductor 96 to the dynamo, to provide the results above pointed out.

The controller 29 is thus operative when moved in opposite directions for reversing the flow of current through the armature of the motor while the current flows through the field coils of the motor in the same direction at all times, and the controller also enables the speed of the motor to be controlled in either direction by cutting out and in the resistance 26.

Since the dynamo is provided with compound wound field coils, it is evident that current will flow through the shunt field coil 25 at all times, as long as the shunt is closed, and which provides for the uniform operation of the dynamo. The shunt includes the shunt field coil 25, conductor 49 including the rheostat 51, contact 47, switch blade 32, contact 48, and conductor 50. By providing the rheostat 51 in the shunt of the dynamo, this enables the current traversing the shunt to be controlled, whereby the electrical energy can be increased and retarded for controlling the speed of the machine in connection with the controller, and which provides a convenient and practical arrangement. It is apparent that when the load is heavy, a greater amount of current will traverse the shunt field coil 25 to maintain or increase the field intensity. By controlling the rheostat 51 through the medium of the pedal 52 or otherwise, the resistance of the shunt can be increased or diminished, thereby increasing or decreasing the electrical energy produced by the dynamo. The rheostat 51 can be made use of when traveling upon hills, as will be apparent.

The storage battery 27 is charged during the operation of the motor, the conductor 44 being connected to the strips 59—60. Thus, when the strips 59—60 engage the contacts 68 and 70, respectively, the following battery charging circuit is established: the dynamo armature, the brush 22, coil 24, conductor 90, contact 68, strip 59, conductor 44, contact 43, switch blade 31, conductor 35, storage battery 27, conductor 36, switch blade 30, contact 41, conductor 42 and brush 23. The current flowing through the shunt in which the battery 27 is now disposed, is controlled by the rheostat 46, and is indicated by the ammeter 45.

The switch 28 is especially designed and constructed so that in operation it works a double series of functions in connection with a releasing spring S, whereby, on the one hand, by pressing down and holding the pedal 28ª, switch blades 30, 31 and 32 leave the contacts 41, 43, 47 and 48 to engage a lesser number of contacts 37—39. In operation, this movement of the blades, with the engine stopped, results in the flow of current from the battery to the dynamo 3, instead of—as in the reverse position of the blades with the dynamo speeded up—from the dynamo to the battery. The same movement also opens up the shunt of the dynamo including the shunt field coil 25, as it closes the circuit to the battery 27, resulting in effectuating the dynamo 3 to operate as a series motor to initially start the prime mover or engine, which dynamo 3 secures its supply of current for said purpose from the storage battery 27. On the other hand, when pressure is released from the pedal 28ª of switch 28, the switch blades immediately spring back to their original position and contacts, opening up the circuit between the battery 27 and dynamo 3, causing the current to flow from the dynamo 3 to the battery 27 for charging purposes when the dynamo is speeded up, and this movement also closes the shunt including the field coil 25 of the dynamo, causing it to respond to its primary use as a compound dynamo or generator for delivery of current to the motor 4. This same movement also effectuates still another important function. Thus, after the power plant and vehicle have come to a standstill by having moved the lever 55 of the controller 29 to its neutral position, circuit 44 between the battery 27 and switch 28 opens with mechanical certainty, preventing any current discharge or leak away from battery.

The present apparatus provides for the ease and flexibility of action and control incident to the ordinary electrically propelled vehicle, without resorting to any storage battery to operate the motor for vehicle propulsion, which is objectionable for obvious reasons, and uses a hydrocarbon engine or other prime mover for providing sufficient power to rotate the dynamo or generator at the desired speed. The storage battery is small for starting the engine only, and need not be so cumbersome as storage batteries now used upon electrically propelled vehicles. The apparatus eliminates the greater wear and tear visited upon the hydrocarbon engine or prime mover, including frictional losses, and involving a less consumption of lubricant and fuel, than obtains, where drive propulsion to the vehicle or other moving body to be driven derives its propulsion energy wholly from a prime mover. In consequence of these propulsion and frictional economies, less maximum horse power energy is requisite to serve a similar propulsion service.

It is to be understood, further, that the hydrocarbon engine or prime mover 1, the dynamo or generator 3, and the motor 4 comprising in substance the power plant of the invention are quickly detachable units in themselves, and are interconnected by flexible couplings, thus providing respectively for ease and unit disassembly and lack of rigidity in the assembled connections.

Having thus described the invention, what is claimed as new is:

1. The combination of an engine, a dynamo connected to the engine to operate it and be operated thereby, a motor, a controller connected to the dynamo and motor and operable for controlling the direction and speed of rotation of the latter, a storage battery, and a switch connected to the dynamo, storage battery and controller and operable when in one position for connecting the storage battery and dynamo through the controller whereby current will flow in one direction from the dynamo to the storage battery, and when in another position to connect the dynamo and storage battery whereby current flows in the opposite direction from the battery to the dynamo to operate the dynamo as a motor for starting the engine, the controller serving to open the circuit of the dynamo, storage battery and switch when the switch is in its first mentioned position with the controller in neutral position.

2. The combination in an electric propulsion system, of an engine, a compound wound dynamo connected to the engine to operate it and to be operated thereby, a motor, a controller connected to the dynamo and motor for controlling the direction and speed of rotation of the motor, a storage battery, and a switch connected to the dynamo, its shunt field coil, and storage battery, said switch being operable when in one position for connecting the shunt field coil in the circuit and for connecting the dynamo and storage battery whereby current flows in one direction from the dynamo to the storage battery, said switch when in another position being operable to disconnect the shunt field coil from the circuit and to connect the storage battery and dynamo whereby current flows in the opposite direction between the dynamo and storage battery so that the dynamo acts as a series motor for starting the engine.

3. The combination in an electric propulsion system, of an engine, a compound wound dynamo connected to the engine to operate it and to be operated thereby, a motor, a controller connected to the dynamo and motor for controlling the direction and speed of rotation of the motor, a storage battery, and a switch connected to the dynamo, its shunt field coil, and storage battery, said switch being operable when in one position for connecting the shunt field coil in the circuit and for connecting the dynamo and storage battery whereby current flows in one direction from the dynamo to the storage battery, said switch when in another position being operable to disconnect the shunt field coil from the circuit and to connect the storage battery and dynamo whereby current flows in the opposite direction between the dynamo and storage battery so that the dynamo acts as a series motor for starting the engine, said switch being connected to the controller whereby when the switch is in first mentioned position and the controller is in neutral position, the circuit of the dynamo, storage battery and switch will be opened by the controller.

4. The combination of an engine, a dynamo to operate it and be operated thereby, a motor, a controller for the motor, a storage battery, and means operable independently of the controller for connecting the storage battery and dynamo for the flow of current in one direction to charge the storage battery, and for connecting the dynamo and storage battery so that the current flows in the opposite direction to operate the dynamo as a motor for starting the engine, the controller when in neutral position preventing the flow of current in the first mentioned direction between the storage battery and dynamo.

5. The combination of an engine, a compound wound dynamo to operate it and to be operated thereby, a motor, a controller for the motor, a storage battery, and means operable independently of the controller for connecting the dynamo and storage battery with the shunt field coil in the circuit so that current flows in one direction from the dynamo to the storage battery to charge the latter, and for connecting the storage battery and dynamo whereby current flows in the opposite direction, with the shunt field coil cut out of the circuit, to operate the dynamo as a series motor, the controller when at neutral position preventing the flow of current in the first mentioned direction between the dynamo and storage battery.

In testimony that we claim the foregoing as our own, we have hereto affixed our signatures in the presence of two witnesses.

GUY D. SMITH.
LAWRENCE E. BRANDON.

Witnesses:
C. C. SLOGGETT,
ELMER CROWE.